Patented Feb. 9, 1954

2,668,833

UNITED STATES PATENT OFFICE 2,668,833

ETHYLXANTHOYLTHIOXY-N,N-DIETHYL-AMINO-CYANOPHOSPHINE OXIDE

Henry Tolkmith, Midland, Mich., assignor to The Dow Chemical Company, Midland, Mich., a corporation of Delaware No Drawing. Application April 21, 1953, Serial No. 350,246

1 Claim. (Cl. 260—455)

This invention is directed to the ethylxanthoyl-thioxy-N,N-diethylamino-cyanophosphine oxide of the formula

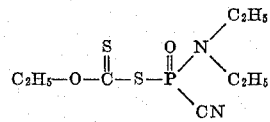

This compound is a viscous oil, somewhat soluble in many organic solvents and substantially insoluble in water. It is of value as an intermediate for the preparation of more complex phosphate derivatives and as a toxic constituent of parasiticide compositions.

The new compound may be prepared by reacting sodium cyanide with S-(ethylxanthoyl) N,N-diethylamidothiophosphoric chloride of the formula

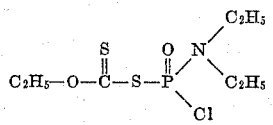

in an inert organic solvent such as benzene. In practice, good results have been obtained when employing about 1.3 molecular proportions of sodium cyanide with each molecular proportion of S-(ethylxanthoyl) N,N-diethylamidothiophosphoric chloride.

In carrying out the reaction, the sodium cyanide and S-(ethylxanthoyl) N,N-diethylamidothiophosphoric chloride are dispersed in the solvent and the resulting mixture heated for a period of time at a temperature of from 40° to 80° C. Since the desired product has a tendency to decompose at temperatures in excess of 80° C., reaction temperatures substantially in excess of 80° C. for any appreciable period of time are to be avoided. Upon completion of the reaction, the mixture may be distilled under reduced pressure at gradually increasing temperatures up to a temperature of 80° C. to separate low boiling constituents, and to obtain as a residue the desired ethylxanthoylthioxy - N,N - diethylamino-cyanophosphine oxide.

The S-(ethylxanthoyl) N,N-diethylamidothiophosphoric chloride employed as a starting material in the above-described method may be prepared by reacting one molecular proportion of sodium ethylxanthate with one molecular proportion of diethylamidophosphoric dichloride in an inert organic solvent such as benzene. In carrying out the reaction, the reactants are dispersed in the solvent and the resulting mixture heated for a period of time at a temperature of from 40° to 80° C. To avoid decomposition, temperatures substantially in excess of 80° C. should not be employed. Upon completion of the reaction, the reaction mixture may be filtered and the filtrate concentrated by distillation under reduced pressure at gradually increasing temperature up to a temperature of 80° C. to obtain as a residue the desired S-(ethylxanthoyl) N,N-diethylamidothiophosphoric chloride. This compound and described method for its production constitute the subject matter of my copending application Serial No. 203,767, filed December 30, 1950.

In a representative preparation, 7 grams (0.14 mole) of sodium cyanide and 30 grams (0.109 mole) of S-(ethylxanthoyl) N,N-diethylamidothiophosphoric chloride (having a density of 1.195 at 18° C.) were dispersed in 150 milliliters of benzene and the resulting mixture heated for 3 hours at the boiling temperature and under reflux. At the end of this period the mixture was filtered and the filtrate concentrated by distillation under reduced pressure to a temperature up to 60° C. to obtain as a residue 21.8 grams of an ethylxanthoylthioxy - N,N - diethylamino-cyanophosphine oxide product. The latter is an oily liquid having a density of 1.187 at 18° C.

The new ethylxanthoylthioxy-N,N-diethylamino-cyanophosphine oxide has been tested and found effective as a parasiticide and is adapted to be employed for the control of a wide range of agricultural and household pests such as flies, mites, aphids, beetles, and cockroaches. For such use, the compound may be dispersed in an inert finely divided solid and employed as a dust. Also, such mixtures may be dispersed in water with the aid of a dispersing and wetting agent and the resulting aqueous suspensions employed as sprays. In other procedures, the new product may be employed in oils, as a constituent in oil-in-water emulsions, or in water dispersion with or without the addition of emulsifying, wetting or dispersing agents. Suitable concentrations of the toxicant in dusts are in the order of from about 0.1 to 10 percent by weight of the dust and in liquid suspensions from about 0.1 to 3 pounds per 100 gallons of the spray mixture.

This is a continuation-in-part of my copending application Serial No. 203,780, filed December 30, 1950.

I claim:

Ethylxanthoylthioxy-N,N-diethylamino-cyanophosphine oxide.

HENRY TOLKMITH.

No references cited.